June 13, 1939.　　　　　T. D. BARNES　　　　　2,162,522

WATT-HOUR METER LOAD COMPENSATION

Filed May 22, 1937

WITNESSES:

INVENTOR
Thomas D. Barnes.
BY
ATTORNEY

Patented June 13, 1939

2,162,522

UNITED STATES PATENT OFFICE 2,162,522

WATT-HOUR METER LOAD COMPENSATION

Thomas D. Barnes, Newark, N. J., assignor to Westinghouse Electric & Manufacturing Company, East Pittsburgh, Pa., a corporation of Pennsylvania Application May 22, 1937, Serial No. 144,154

2 Claims. (Cl. 171—264)

The invention relates to watthour meters and other instruments of the induction disc type and more specifically to an improved means for compensating such meters and instruments for variations in speed under overload conditions. Although the invention is described with specific reference to a watthour meter, it will obviously be applicable to other types of electromagnetic devices.

In the induction type of watthour meter, a current flux and a potential flux are imposed upon a disk armature to set up a shifting or rotating field causing the armature to rotate. Within the rating of the meter, the rotation of the disk armature is substantially proportional to the energy of the circuit with which the meter is associated. However, under existing conditions, frequently the full load rating of the meter is greatly exceeded, 300% or 400% rated load being quite common. As the load on the meter increases, the self-damping of the disk movement caused by the current flux becomes more marked and the speed of the disk falls off and is no longer an accurate representation of the energy of the circuit with which the meter is associated.

The decrease in armature speed due to self-damping has been compensated to some extent, in the past, by means of a saturable shunt or shunt of diminishing magnetic permeability in parallel with the disk armature gap, which at a predetermined energization of the current coil, becomes magnetically saturated, or of greatly lowered permeability, and thereby causes a greater portion of the current coil flux to traverse the disk armature. This results in an increase in torque, and consequently, an increase in speed of the armature to overcome the decrease in speed that would otherwise obtain due to self-damping by the current coil flux. However, the saturation or decrease in permeability of the shunt is more or less abrupt and affords accurate compensation only for a relatively narrow range in overload on the current coil. As a result, the registration curve of the meter, as the load increases, tends to gradually fall off just before the energization of the coil is sufficient to saturate the shunt, or to make a definite reduction in its permeability. Then as this point of decreased permeability is reached, the curve rises relatively abruptly for a portion of the curve as the load increases, after which the compensating effect is relatively quickly lost and the curve again falls off. This means that the amount of overall compensation is limited by the adverse "hump" or rise in registration that can be tolerated at the point where the shunt action is so definite.

It is an object of the present invention to provide an overload shunt for an electromagnet of such character that as the energization of the winding of the electromagnet increases beyond a predetermined point, it becomes progressively saturated or of slowly decreasing permeability so as to progressively shunt less and less flux in accordance with the progressive increase in the energization of such winding, thus producing an increasing torque of substantially equal and opposite sign to that of the series damping throughout the current range of the meter. Consequently a substantially accurate registration, or straight line load curve, obtains throughout the entire range.

Other objects of the invention will be apparent from the following description, taken in connection with the accompanying drawing, in which.

Wherever the term "saturated" is used, it carries the connotation of "decremental permeability", "effective decrease in permeability" or "relatively fast reduction in permeability".

Figure 1:
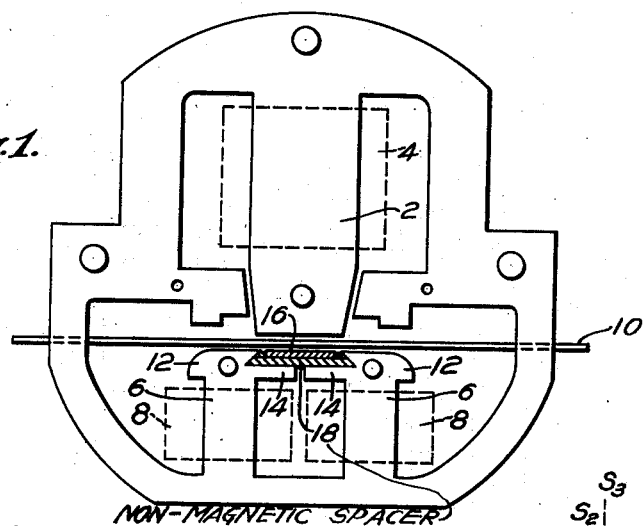
Figure 1 is a view in elevation, with portions in section, of an electromagnet embodying the present invention.

Referring to Fig. 1, a common type of watthour meter electromagnet is shown. It comprises a lamination structure having a core portion 2 for receiving a potential winding 4 (shown in dotted lines), and a pair of current core portions 6 for receiving current or series windings 8 (shown in dotted lines); the potential and series pole portions being extended toward each other and separated by an air gap in which is disposed a rotatable disk armature 10. The various features of the conventional electromagnet shape are more or less well known and need not be described further.

Each of the series poles 6 terminates in a pole portion 12 including relatively long lateral extensions 14 tending to bridge the gap between the poles.

Figures 2, 3:
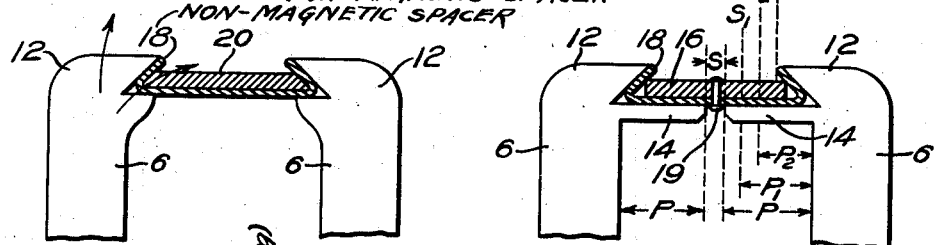
Fig. 2 is a fragmentary view in elevation of a portion of an electromagnet with a load compensator in accordance with the prior art.
Fig. 3 is a view similar to Fig. 2 showing on an enlarged scale a portion of Fig. 1.

As shown more clearly in Figs. 1 and 3, the ends of the lateral extensions 14 are separated by an air gap which is very narrow; and a shunt 16 of magnetic material overlies both of them, bridging the air gap. Preferably, the shunt 16 is out of contact with the pole portions and extensions 14 by means of a non-magnetic spacer 18 of a desired material, such as brass, copper, fiber, etc. If desired, the ends of the spacer 18 may not be turned up as shown, the air space between the ends of shunt 16 and the pole portions being sufficient. A rivet 19 (Fig. 3) or similar expedient may be used to secure the shunt and spacer together.

With the ordinary type of overload shunt, as shown in Fig. 2, under normal conditions part of the series flux traverses the disk armature and part of it traverses the shunt 20. As the load increases, the amount of shunted flux increases substantially proportionally to load until the saturation point, or point of active permeability decrease, of the shunt is reached, whereupon with an increasing amount of series current, the proportion of shunted flux is substantially reduced and a greater proportion of the flux is diverted across the disk armature, producing an increase in effective flux acting on the disk armature. The range of this effect is relatively small, however, after which the flux across the disc armature again increases substantially proportionally to load, which means continued adverse series current damping.

In accordance with the present invention, however, and referring more particularly to Fig. 3, under normal conditions and below a predetermined energization of the series winding, each series pole portion 6 has an effective pole face area P projected onto the shunt 16, in addition to the area indicated in Fig. 2, represented by the length of the laterally extending portion 14.

As the series flux increases due to an increased energization of the series winding, the shunt 16 will first saturate at the section S which overlies the gap between the spaced ends of the projecting portions 14.

As the series flux further increases, the portions of the shunt on each side of section S, such as S1 become saturated reducing the effective pole face area of the shunt to the value P1. Upon still further increase in series flux, successive sections of the shunt such as S2 and S3 become saturated further decreasing the effective pole face area of the shunt and causing incremental amounts of the series flux to traverse the disk armature.

This progressive saturation of the overload shunt produces two effects: (1) The progressive increase in absolute flux across the disc armature as the shunt saturates, and (2) the action whereby, as the shunt saturates, the effective series fluxes from each pole move outward from near the center into gradually more effective zones. By suitably proportioning the thicknesses of shunt 16 and non-magnetic spacer 18, and by arranging that the shunt be relatively long or approaching the pole pitch of the series poles, and that the pole tip projections onto said shunt cover the maximum amount of the shunt area, consistent with other characteristics, the compensation can be proportioned to give a substantially accurate meter registration over the entire working load range up to such values, for example, as 300, 400, or 500 per cent rated load.

Figure 4:
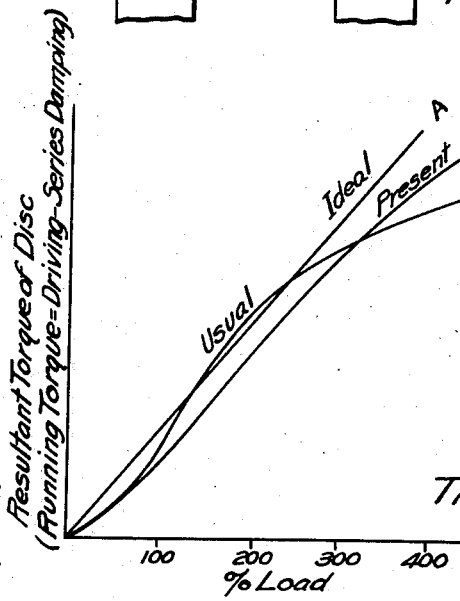
Fig. 4 shows a set of curves explanatory of the invention.

Referring to Fig. 4, curve C indicates the action of the usual or prior type of overload shunt. It will be noted that the flux traversing the disk as the load increases rises quite abruptly and flattens out as the shunt becomes saturated. The compensation is thus of short duration and produces an objectionable hump at some load, usually around 200% rated load. An ideal condition is indicated by the curve A where the flux across the disk increases along a straight line with an increase in the load on the meter. In accordance with the present invention, the overload compensation substantially follows the curve B, which, it will be noted, follows much closer the characteristics of the curve A than does curve C; and results in a gradual compensation for the meter over a relatively wide range in load without imposing, as in curve C, a sudden compensation which is effective only over a relatively narrow range in load, usually at some such point as 200% rated current, as shown.

Quite obviously modifications may be made in the construction shown in order to follow the theory of the invention, and it is intended that the invention be not limited except as by the appended claims.

I claim as my invention:

1. In a magnet device, a pair of spaced magnet poles each having a pole face for producing a magnetic field in a region defined by said pole faces, magnetic extension means extending across a major portion of the space between said poles for adding an auxiliary magnetic flux to said region, and a magnetic shunt extending between said magnet poles and overlying said extension means for diverting a portion of the flux from said extension means to establish a flux density in said magnetic shunt that varies gradually from a point adjacent one of said pole faces to a point remote from said one pole face under a light magnetic flux loading, said shunt saturating gradually from one of said points to the other of said points as the magnetic flux loading increases for gradually increasing the reluctance offered to the flow of said auxiliary magnetic flux from said extension means to said region.

2. In a magnet structure; a pair of magnet poles each having a main pole face and an adjacent auxiliary pole face for normally aiding the main pole face to establish a main magnetic field, and a uniform magnetic shunt having a substantial portion overlying said auxiliary pole faces for diverting a part of the magnetic flux from said auxiliary pole faces through said magnetic shunt to produce in said shunt a flux density that gradually increases from a point adjacent one of said main pole faces to a point distant from said main pole face under a light magnetic flux loading of said magnet poles, said magnetic shunt saturating gradually from said distant point to said adjacent point as the magnetic flux loading increases to gradually increase the reluctance of the path between said auxiliary pole faces and said main magnetic field.

THOMAS D. BARNES.